Patented Oct. 27, 1942

2,299,834

UNITED STATES PATENT OFFICE 2,299,834

HALOGEN CONTAINING ACYLAMINOSULPHONIC ACIDS AND THEIR MANUFACTURE

Henry Martin and Rudolf Hirt, Basel, and Hans Zaeslin, Riehen, near Basel, Switzerland, assignors to the firm of J. R. Geigy A. G., Basel, Switzerland No Drawing. Application December 20, 1940, Serial No. 371,053. In Switzerland December 14, 1939

14 Claims. (Cl. 260—507)

It has been found that valuable halogen substituted acylaminosulphonic acids of the aromatic series are obtained by causing aminosulphonic acids of the benzene series containing hydrogen exchangeable at the nitrogen atom to react with acids of the diphenylether- or diphenylsulphide series or of its reactive derivatives, whereby the reaction components are so chosen that at least one halogen atom is present in the final compound.

The free carboxylic acids, however, especially their reactive derivatives such as the chlorides or esters are suitable as acids of the diphenylether- or diphenylsulphide series; the corresponding sulphonic acid chlorides come also into consideration. Nucleus-halogenated and/or alkylated diphenylether- or diphenylsulphide dicarboxylic or -sulphonic acids are particularly valuable. They can readily be prepared according to known processes. Thus, for example, in starting from halogenated or alkylated aminodiphenyl ethers or diphenyl sulphides, the carboxylic acids may easily be obtained through the nitriles. The corresponding sulphonic acids are obtained, for example, by oxidation of the sulphinic acids which, in their turn, may be obtained from diazotised aminodiphenylethers by means of sulphur dioxide. Of course, there can also be used the sulphonating products, such as the sulphonic acids as well as their chlorides, directly obtainable from diphenylethers in the usual manner with sulphonating agents.

As aminosulphonic acids the o-anilic acid, 3:4-dichloraniline sulphonic acid, 4-chloraniline-2-sulphonic acid, benzidine disulphonic acid, m-phenylene diamine sulphonic acid and so on are for instance suitable. The claimed compounds are suitable for the most different purposes of use, but especially for the use as moth-proofing agents.

The present invention is illustrated, but not limited, by the following examples, the parts being by weight where nothing other is said.

Example 1

24 parts of 3:4-dichloraniline-6-sulphonic acid are suspended in 100 parts by volume of pyridine, then mixed at 20° C. with 30 parts of 4-chloro-1:1'-diphenylether-4'-carboxylic acid chloride, B. P. at 0.5 mm.=185° C., (made in the usual manner from 4-chloro-1:1'-diphenylether-4'-carboxylic acid and phosphorus pentachloride) and the whole is stirred for 10 hours at ordinary temperature. Then it is distilled with steam, mixed with a bicarbonate solution, dissolved in much hot water and filtered. The condensation product is separated out from the hot filtrate with brine in form of crystals. It is sucked off, washed with cold water and dried in vacuo. It possesses the following formula:

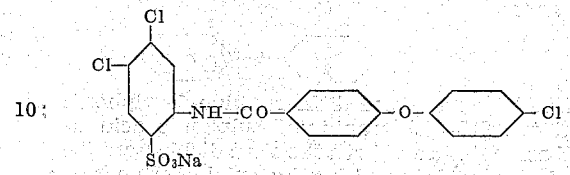

Instead of the 3:4-dichloraniline-6-sulphonic acid the 4-chloraniline-6-sulphonic acid can also be used. The 4-chloro-1:1'-diphenylether-4'-carboxylic acid, M. P. 168° C., is obtained by saponification of the 4-chloro-4'-cyano-1:1'-diphenylether, B. P. at 0.6 mm.=160° C., M. P.=81 to 83° C., by means of boiling aqueous caustic soda lye of 20% strength. The cyano-compound may be prepared according to known methods from diazotised 4-chloro-4'-amino-1:1'-diphenylether.

Instead of the 4-chloro-1:1'-diphenylether-4'-carboxylic acid chloride the 2':4-dichloro-1:1'-diphenylether-4'-carboxylic acid chloride, B. P. at 13 mm.=218° C. (made from the free acid by means of phosphorus pentachloride) can also be used; the latter is prepared from 2':4-dichloro-4'-amino-1:1'-diphenylether, B. P. at 0.8 mm.=203° C., according to known processes through the 2':4-dichloro-4'-cyano-1:1'-diphenylether, B. P. at 2 mm.=250° C.

The 2:4-dichloro-1:1'-diphenylether-4'-carboxylic acid chloride, B. P. at 12 mm.=225° C., comes also into consideration. It is made according to the known method from the 2:4-dichloro-4'-amino-1:1'-diphenylether, B. P. at 1 mm.=200° C., through the 2:4-dichloro-4'-cyano-1:1'-diphenylether, B. P. at 1 mm.=195° C.

Instead of the 3:4-dichlor-aniline-6-sulphonic acid there can be used the aminosulphonic acids enumerated in the general part of the specification or the 4-chloraniline-2-sulphonic acid, the 3-methyl-6-chloro-1-aminobenzene-4-sulphonic acid, the 2-chloro-5-methoxy-1-aminobenzene-4-sulphonic acid. Instead of the 4-chloro-1:1'-diphenylether-4'-carboxylic acid chloride the chlorides or bromides of the 4-methyl-3-chloro-1:1'-diphenylether-4'-carboxylic acid, of the 4:4'-dichloro-1:1'-diphenylether-2-carboxylic acid, of the 3':4'-dichloro-1:1'-diphenylether-4-carboxylic acid, of the 2':4-dichloro-1:1'-diphenylether-2-carboxylic acid, of the 4-bromo-1:1'-diphenylether-4-carboxylic acid, of the 4'-chlorodiphenylsulphide-4-carboxylic acid, of the 3':4'-dichlorodiphenylsulphide-4-carboxylic acid and so on can also be used. Also esters, such as for instance the 4-chloro-1:1'-diphenylether-4'-carboxylic acid methyl- or ethylester can also be used.

*Example 2*

24.2 parts of 3:4-dichloraniline-6-sulphonic acid are suspended in 100 parts by volume of pyridine, then mixed with 30 parts of 4-chloro-1:1'-diphenylether-4'-sulphonic acid chloride, B. P. at 0.8 mm.=198–199° C., M. P. 57–59° C. (made from 4-chloro-1:1'-diphenylether-4'-sulphonate of sodium with phosphorus pentachloride in boiling chlorobenzene) and the whole is stirred for several hours at 90–95° C. The pyridine is then blown off by means of steam. The condensation product on becoming cold precipitates out from the aqueous solution in form of crystals. It has the following formula:

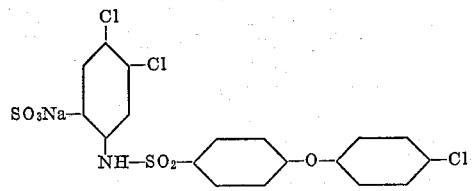

Instead of the 3:4-dichloraniline-6-sulphonic acid the 2:3-dichloraniline-5-sulphonic acid as well as a mixture of both the cited dichlor-aniline sulphonic acids, resulting by sulphonation and nitration of o-dichlorobenzene and subsequent reduction, may also be used. Likewise all the amino-benzene sulphonic acids enumerated at the end of Example 1 come also into question.

The 4-chloro-1:1'-diphenylether-4'-sulphonic acid is made as follows:—4-chloro-4'-amino-1:1'-diphenylether is diazotised and treated, in the presence of copper sulphate, with sulphur dioxide whereby the free sulphonic acid separates out. The sodium salt thereof is oxidised in aqueous solution with permanganate to the sulphonic acid.

Instead of the 4-chloro-1:1'-diphenylether-4'-sulphonic acid chloride the 1:1'-diphenylether-4-sulphonic acid chloride, B. P. at 0.6 mm.=163°, M. P. 42–43°, can also be used. This compound is made in a corresponding manner.

Compounds of similar good properties are obtained by using 2'-chloro-1:1'-diphenylether-4-sulphochloride, 2':4-dichloro-1:1'-diphenylether-4-sulphochloride or 4'-methyl-3'-chloro-1:1'-diphenylether-4-sulphochloride for the acylation.

The greatest number of the above mentioned compounds of the aminobenzene sulphonic acid series as well as of the diphenylether- or -sulphide series are known. Where this is not the case, the new compounds can easily be made according to known analogous processes.

What we claim is:

1. A process for the manufacture of halogen-substituted acylaminosulphonic acids, comprising acylating an aminobenzenesulphonic acid containing at a nitrogen atom at least one exchangeable hydrogen atom with a member selected from the group consisting of the esters and halides of diphenylether-carboxylic and diphenylsulphide-carboxylic and sulphonic acids, whereby the two components are so chosen that at least one halogen atom is present in the final acylated compound.

2. A process for the manufacture of halogen-substituted acylaminosulphonic acids, comprising acylating a halogensubstituted aminobenzenesulphonic acid containing at a nitrogen atom at least one exchangeable hydrogen atom with a member selected from the group consisting of the esters and halides of halogensubstituted diphenyl-ether-carboxylic and diphenylsulphide-carboxylic and sulphonic acids.

3. A process for the manufacture of halogen-substituted acylaminosulphonic acids, comprising acylating a halogen substituted anilinesulphonic acid with a compound of the formula:

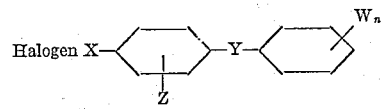

wherein X means a member selected from the group consisting of CO and $SO_2$, Y means a member selected from the group consisting of O and S, W means a member selected from the group consisting of H, Cl, Br, and $CH_3$, Z means one member of the group consisting of H and Cl, and $n$ is one to two.

4. A process for the manufacture of halogen-substituted acylamino sulphonic acids, comprising acylating 3:4-dichloraniline-6-sulphonic acid with a compound of the formula:

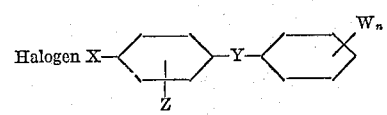

wherein X means a member selected from the group consisting of CO and $SO_2$, Y means a member selected from the group consisting of O and S, W means a member selected from the group consisting of H, Cl, Br, and $CH_3$, Z means one member of the group consisting of H and Cl, and $n$ is one to two.

5. A process for the manufacture of a halogen-substituted aclylamino sulphonic acid, comprising acylating 3:4-dichloraniline-6-sulphonic acid with 4'-chloro-1:1'-diphenylether - 4 - carboxylic acid chloride.

6. A process for the manufacture of a halogen-substituted acylamino sulphonic acid, comprising acylating 3:4-dichloraniline-6-sulphonic acid with 4'-methyl-3'-chloro-1:1'-diphenylether - 4 - carboxylic acid chloride.

7. A process for the manufacture of a halogen-substituted acylamino sulphonic acid, comprising acylating 3:4-dichloraniline-6-sulphonic acid with 4'-chloro-1:1'-diphenylether-4-sulphochloride.

8. The halogen-substituted acylaminosulphonic acids of the following general formula

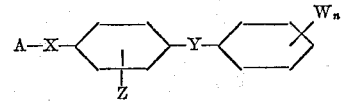

wherein A means the radical of an aminobenzenesulphonic acid connected by means of a nitrogen atom with the group X, X means a member selected from the group consisting of CO and $SO_2$, Y means a member selected from the group consisting of O and S, W means a member selected from the group consisting of H, Cl, Br, and $CH_3$, Z means a member selected from the group consisting of H and Cl, and $n$ is one to two, said products being in pure state water-soluble colorless compounds with excellent moth-proofing properties.

9. The halogen-substituted acylaminosulphonic acids of the following general formula

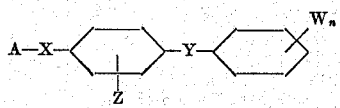

wherein A means the halogen-substituted radical of an aminobenzenesulphonic acid connected by means of a nitrogen atom with the group X, X means a member selected from the group consisting of CO and $SO_2$, Y means a member selected from the group consisting of O and S, W means a member selected from the group consisting of H, Cl, Br, and $CH_3$, Z means a member selected from the group consisting of H and Cl, and $n$ is one to two, said products being in pure state water-soluble colorless compounds with excellent moth-proofing properties.

10. The halogensubstituted acylaminosulphonic acids of the following general formula

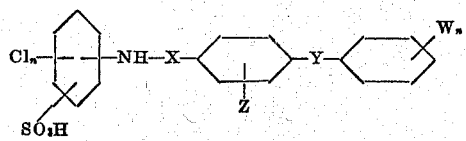

wherein X means a member selected from the group consisting of CO and $SO_2$, Y means a member selected from the group consisting of O and S, W means a member selected from the group consisting of H, Cl, Br, and $CH_3$, Z means a member selected from the group consisting of H and Cl and $n$ is one to two, said products being in pure state water-soluble colorless compounds with excellent moth-proofing properties.

11. The halogensubstituted acylaminosulphonic acids of the following general formula

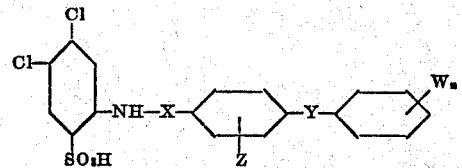

wherein X means a member selected from the group consisting of CO and $SO_2$, Y means a member selected from the group consisting of O and S, W means a member selected from the group consisting of H, Cl, Br, and $CH_3$, Z means a member selected from the group consisting of H and Cl, and $n$ is one to two, said products being in pure state water-soluble colorless compounds with excellent moth-proofing properties.

12. The halogensubstituted acylamino sulphonic acid of the formula

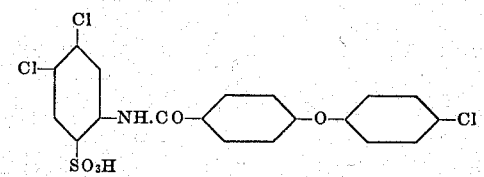

said product being in pure state a colorless, water-soluble compound with excellent moth-proofing properties.

13. The halogensubstituted acylamino sulphonic acid of the formula

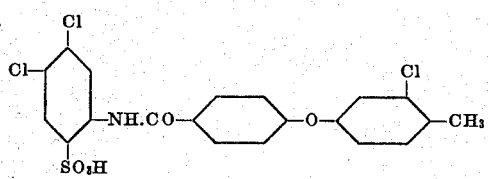

said product being in pure state a colorless, water-soluble compound with excellent moth-proofing properties.

14. The halogensubstituted acylamino sulphonic acid of the formula

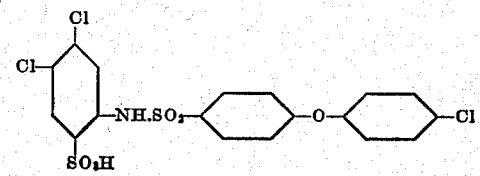

said product being in pure state a colorless, water-soluble compound with excellent moth-proofing properties.

HENRY MARTIN.
RUDOLF HIRT.
HANS ZAESLIN.